US008015089B1

(12) United States Patent
Baya'a et al.

(10) Patent No.: US 8,015,089 B1
(45) Date of Patent: Sep. 6, 2011

(54) SYSTEM AND METHOD FOR PROVIDING A PRE-PAID COMMODITY-BASED CREDIT ACCOUNT

(76) Inventors: Ziad Baya'a, Irvine, CA (US); Ahmad Baya'a, Irvine, CA (US)

(*) Notice: Subject to any disclaimer, the term of this patent is extended or adjusted under 35 U.S.C. 154(b) by 0 days.

(21) Appl. No.: 12/848,682

(22) Filed: Aug. 2, 2010

(51) Int. Cl.
*G06Q 40/00* (2006.01)
(52) U.S. Cl. ............................................. 705/35; 705/39
(58) Field of Classification Search .................... 705/35, 705/39
See application file for complete search history.

(56) References Cited

U.S. PATENT DOCUMENTS

| 5,671,364 | A | 9/1997 | Turk |
| 7,206,763 | B2 | 4/2007 | Turk |
| 2003/0191708 | A1* | 10/2003 | Turk ................................ 705/39 |
| 2005/0086153 | A1 | 4/2005 | Scott |
| 2007/0108275 | A1 | 5/2007 | Shuster |
| 2007/0244812 | A1 | 10/2007 | Turk et al. |
| 2009/0076941 | A1 | 3/2009 | Schneierson et al. |

FOREIGN PATENT DOCUMENTS

JP 2002049753 A * 2/2002

OTHER PUBLICATIONS

Human Translation of Matsufuji, JP 2002049753.*
E-gold Ltd., e-gold, http://www.e-gold.com, 1996.
Tamckissick, Gold Based Community Credit Union, Daily Paul, May 11, 2010.
Malaysian Banking Berhad, Gold Savings Passbook Account, http://www.maybank2u.com.my, Accessed Jul. 29, 2010.
Net Transactions Limited, GoldMoney, http://www.goldmoney.com, Accessed Jul. 29, 2010.

* cited by examiner

*Primary Examiner* — Jason M Borlinghaus
*Assistant Examiner* — Hao Fu
(74) *Attorney, Agent, or Firm* — Maulin V. Shah (57) ABSTRACT

This invention relates to a system and method that provides a pre-paid credit account, where the value of the account is based on the market price of an underlying commodity instrument. More specifically, this invention relates to a system and method for managing cash assets in the form of gold bullion that is maintained by a financial institution on behalf of an account holder, thereby allowing the account holder to utilize the purchasing power of the gold bullion assets in a convenient fashion.

20 Claims, 5 Drawing Sheets

SYSTEM AND METHOD FOR PROVIDING A PRE-PAID COMMODITY-BASED CREDIT ACCOUNT

BACKGROUND

1. Field of Invention

This invention generally relates to a system and method that provides a pre-paid credit account, where the value of the account is based on the market price of an underlying commodity instrument. More specifically, this invention relates to a system and method for using a purchase card to make purchases against a credit account secured by an underlying investment in gold bullion.

2. Description of Related Art

Gold is a highly precious and coveted metal, and it is a popular investment vehicle for individual and institutional investors alike. Gold is tradable in troy ounces and, in recent years, it has provided higher returns compared to other investment vehicles, such as equities and real estate. Furthermore, gold has traditionally been considered a safe and conservative means of investing, and it can be easily liquidated into cash and acceptable in various types of transactions throughout the world.

There is a strong demand for gold all over the world, as its value tends to be more stable than currencies and other forms of investment. Specifically in today's market conditions, fluctuating interest rates to fight inflation continues to create a negative climate for investors seeking to invest in traditional equities and bonds. Investors hoping for safer asset types have therefore shifted to investments in commodities such as gold bullion, natural gas, sugar, etc.

As such, gold is an important asset and is safe even in times of economic instability. However, individuals wishing to physically posses gold encounter various hurdles, such as fabrication costs to convert raw gold into market-approved gold bullion bars of standardized shapes and weight, transportation costs, tariffs and taxes to move gold bullion across jurisdictions, and risks associated with safekeeping. Furthermore, the weight and size of gold coins and bars makes it impractical as an everyday trading currency.

Therefore, there exists a need for a system and method for a commodity-based purchasing and investment vehicle that is practical and easy to use.

SUMMARY

In an embodiment, this invention relates to a convenient and practical method of maintaining a credit account where the available credit amount is based on the market value of a commodity, such as gold bullion. The invention provides a system and method wherein a user can deposit cash or other valuables into a banking account, and subsequently, a financial institution purchases commodities using these funds on behalf of the user. The financial institution provides the user with a credit account balance based solely on the value of the underlying commodity, wherein the credit account balance can fluctuate as the market price of the commodity changes.

In an embodiment, the user is issued a purchase card that can be used to make purchases against the credit account balance. The purchase card is linked to the credit account. When a purchase is made, the underlying commodity is sold in an increment equal to the purchase amount, and the credit account balance is debited accordingly. Thus, the purchase card is utilized in a fashion similar to a traditional debit or credit card.

In an embodiment, this invention relates to a method and system for a financial institution to facilitate the servicing and management of a pre-paid commodity-based credit account. The financial institution may collect transaction fees, as well as asset management fees for the service described herein.

BRIEF DESCRIPTION OF THE DRAWINGS

These and other embodiments of this invention will be discussed with reference to the following exemplary and non-limiting illustrations, in which like elements are numbered similarly, and wherein.

DETAILED DESCRIPTION OF EMBODIMENTS

Before the present method and hardware enablement are described, it is to be understood that this invention in not limited to the particular methodologies, and hardware described, as these may vary. It is also to be understood that the terminology used in the description is for the purpose of describing the particular versions or embodiments only, and is not intended to limit the scope of the present invention which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary of the invention, which may be embodied in various forms.

It is to be understood that the invention described herein is meant to strictly follow the recommendations set forth by the Financial Action Task Force (FATF), which provide a complete set of counter-measures to combat money laundering, terrorist financing and financial crimes. Furthermore, the invention is meant to comply with stringent national legislations and policies in force, such as the United States Patriot Act and the Third European Union Money Laundering Directive.

Figure 1:
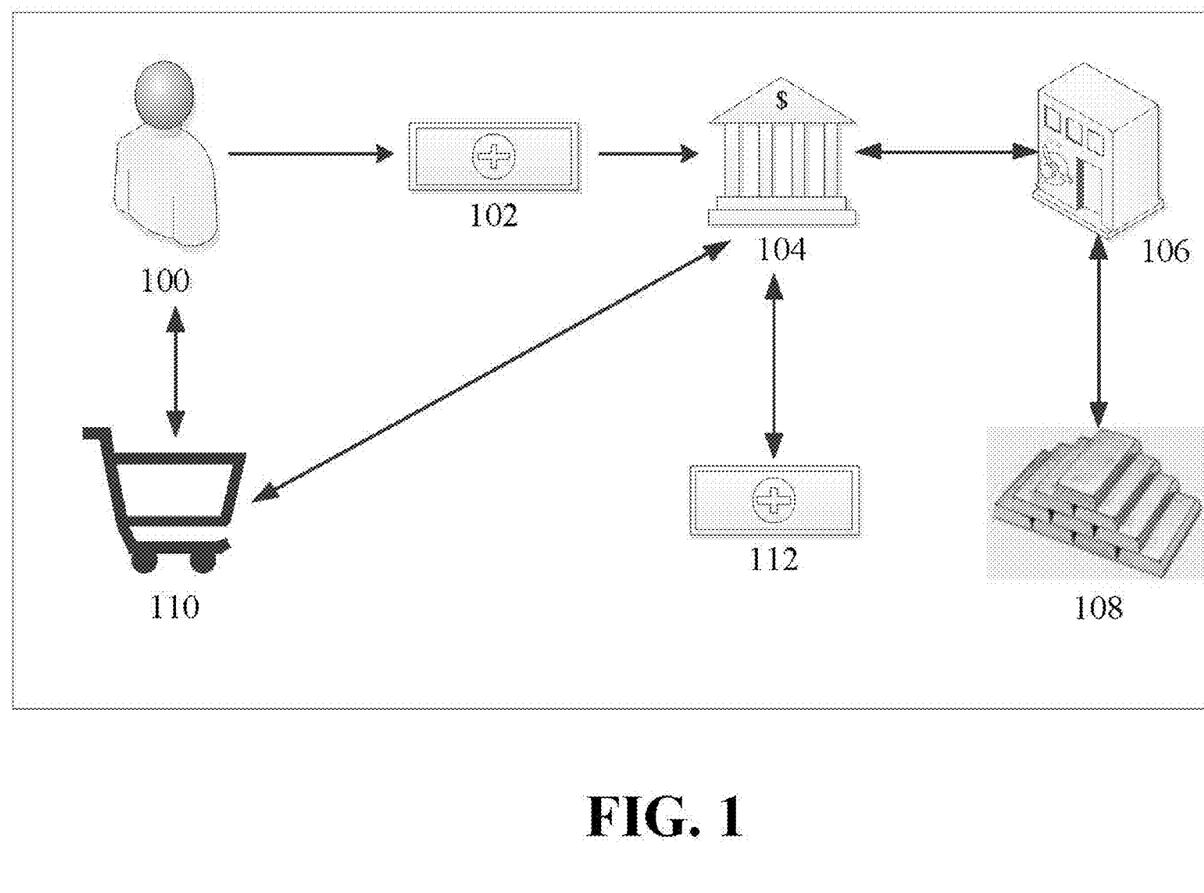
FIG. 1 illustrates the process of utilizing a pre-paid commodity-based credit account according to an embodiment of the invention.

FIG. 1 illustrates the process of utilizing a pre-paid commodity based credit account according to an embodiment of the invention. The user 100 is the account holder, and can be an individual, corporate entity, non-profit organization, or other entity that is legally authorized to hold a banking account. The users of the present invention may be, for example, gold enthusiasts, technologically advanced consumers, those who do not desire to constantly carry large amounts of cash on their person, those who do not trust the value of cash, those who do not qualify for traditional credit cards, and those hoping to appreciate their cash assets in correlation with the increase in gold prices.

In an embodiment, the user 100 is associated with a deposit account 110 at a financial institution 104, such as a bank, credit union, or a third-party pre-paid commodity-based credit account service provider. For the purposes of this invention, the terms "financial institution" and "service provider" can be interchangeable. The service provider can be responsible for many administrative and servicing tasks, such as accepting deposits, providing customer service representatives, facilitating purchases/transactions from merchants, issuing account statements and alerts to users, etc. The service provider can generate revenue by charging the financial institution 104 a fee per user or transaction, or an up-front fixed fee per a set number of users or transactions. This invention makes note of the fact that many businesses, including financial institutions, are outsourcing many ancillary functions such as servicing and fulfillment in order to reduce overhead costs.

In an embodiment, the user 100 may have multiple deposit accounts at the financial institution 104 that are linked, and multiple users may be affiliated with a particular deposit account.

In order to utilize a pre-paid commodity-based credit account, the user 100 must transfer funds into the deposit account 110. Funds can be transferred in a variety of ways, namely physical means such as cash, check, or money order deposited at the financial institution 104, which can include a branch, service center, or automated teller machine (ATM). The user 100 may also transfer funds electronically from another account into their deposit account 110. The other account may be a savings, checking, or brokerage account at the same or another financial institution. In another embodiment, funds may be deposited into the deposit account 110 from another commodity-based credit account owned by the user 100 or another party.

Furthermore, the deposit account 110 can be linked to various online e-commerce financial transaction accounts, such as PayPal and Google Checkout, which allow users to conduct online transactions that are linked to the user's banking account or credit card.

After the deposit account 110 is funded, the financial institution 104 transmits a purchase request to a commodity clearinghouse 106, such as the International Commodities Clearing House (ICCH) or the European Commodity Clearing AG (ECC). The clearinghouse 106 is responsible for clearing and settling commodity purchase and sale transactions. The purchase request includes any account information related to the user 100, the dollar amount of commodity to purchase on behalf of the user 100, and specification of a particular commodity to purchase (if the user 100 wishes to purchase multiple commodities).

The financial institution 104 may request an immediate, real-time purchase from the clearinghouse 106. In another embodiment, there may be a delay in the purchase request as the financial institution 104 may need to verify settlement of the funds placed into the deposit account 102. In a preferred embodiment, the clearinghouse 106 settles the purchase within one-business day or earlier so that the user 100 can take advantage of the spot market price of the commodity on the day they transfer funds into their deposit account 102.

In a preferred embodiment, the commodity is purchased in real-time using an automated clearinghouse, so that the account holder has immediate realization and true market-based value of their account following a transfer of funds into their deposit account 102.

The clearinghouse 106 can purchase commodities directly from commodity suppliers and markets, such as the professional bullion markets. In a preferred embodiment, only gold bullion from the professional bullion market is purchased and sold, thereby permanently guaranteeing quality as this form of gold bullion has always, and will always, remain within accredited depositories or storage facilities. Furthermore, the professional bullion market only trades in fine gold, such as 99.5% purity, thereby ensuring that the gold bullion used within the scope of this invention will retain its full market value.

For example, if the user deposits $1,000.00 USD into the deposit account 102, the financial institution 104 will instruct the clearinghouse 106 to purchase $1,000.00 USD worth of gold bullion at the current spot market price. If the price of gold bullion at the time of the purchase request is $1,000.00 USD per troy ounce, the clearinghouse 106 will purchase one troy ounce of gold bullion on behalf of the financial institution 104 for the user 100.

In an embodiment, the financial institution 104 and/or the clearinghouse 106 may take a service fee for each transaction. For example, if the user 100 deposits $1,000.00 USD into their deposit account 102, the clearinghouse 106 may deduct a 2% service fee from the transaction amount. Thus, the clearinghouse 106 retains $2.00 USD, and purchases a commodity with the remaining balance of $998.00 USD. This service fee can also take the form of a spread, where the difference in the bid price and the ask price is used as a commission for any of the involved transacting parties.

In another embodiment, the financial institution 104 may charge an asset management fee on a monthly or yearly basis; the charge based on the value of the commodity assets being held and managed by the financial institution 104 on behalf of the user 100.

After the clearinghouse 106 purchases the commodity, such as gold bullion, the physical gold bullion bars are stored at an accredited depository or storage facility, such as at Via Mat International or Safes Fidelity. In an embodiment, the user 100 may request gold certificates showing proof of purchase and authenticity. However, the physical gold bullion remains in storage. The user 100 does not receive physical possession of the gold bullion due to the costs and risks associated with logistics, transportation, and handling the gold bullion outside of a secured vault.

In an alternative embodiment, the user 100 may request physical possession of the commodity, such as gold bullion bars. Such a request will cost extra fees, such as transportation and tariff fees.

After the commodity is purchased, the clearinghouse 106 provides a confirmation of the purchase to the financial institution 104. The confirmation includes information such as the purchase price of the commodity, the purchase amount, and any service fees or commissions deducted by the clearinghouse 106. Upon receiving confirmation of the purchase, the financial institution funds a credit account 112 for the user 100.

The credit account 112 allows the user 100 access to funds equal to the underlying commodity's market value. The value of the credit account 112 fluctuates based on the value of the underlying commodity. Going back to the above example, if the value of gold bullion on the day of funding the credit account 112 is $1,000.00 USD, the user will have access to $1,000 USD in the credit account.

If the value of gold bullion increases to $1,100.00 per troy ounce, the value of the credit account will increase to $1,100.00 USD. Conversely, if the value of gold bullion decreases to $900.00 USD per troy ounce, the available credit in the credit account 112 will decrease to $900.00 USD. Thus, the user 100 can take advantage of, and be exposed to, the fluctuations in the spot market for commodities.

In another embodiment, the user 100 can purchase multiple commodities, such as, but not limited to, traditional energy (light crude oil, natural gas, unleaded gasoline, heating oil, ethanol, electricity, alternative energy (solar power, wind power, hydro-electric power), precious metals (silver, platinum, copper, tungsten, steel), agricultural products (corn, soybeans, wheat), livestock (lean hogs, pork bellies, live cattle, feeder cattle), and consumer staples (cocoa, coffee, cotton, sugar). These commodities can be used in conjunction with or in lieu of gold bullion as described herein.

For example, the user 100 can specify that a portion of the funds be used to purchase gold bullion, and another portion of the funds be used to purchase cocoa. After the specified commodities have been purchased through the clearinghouse 106, the value of the user's credit account 112 will fluctuate based on the market prices of each underlying security. This provides the user 100 with a means to diversify their account, and spread risk, hedging, and growth opportunities among various commodities.

Once the credit account 112 is funded, the user 100 can make purchases from merchants 110 against the credit account 112 using a purchase card. The purchase card can be similar to a credit or debit card. When the user 100 initiates a purchase, the merchant 110 contacts the financial institution 104 for authorization. The financial institution 104 verifies that the credit account 112 has the necessary funds to cover the purchase. Upon verification, the financial institution 104 transmits an approval to the merchant 110, who then completes the purchase transaction for the user 100.

The merchant 110 and the financial institution 104 may communicate via an electronic merchant payment gateway, similar to how traditional merchant credit card processing is currently conducted. The merchant 110 can be issued a card processing terminal that includes a card reader specifically configured to handle the purchase card and pre-paid commodity-based credit account system. In another embodiment, commercially available credit card readers can be utilized, and updated with any required firmware or software required by the financial institution 104 to process the transactions described herein.

In an embodiment, the user 100 may be issued a personal identification number (PIN). This PIN is used to verify the identity of the user 100 when they telephone the financial institution 104 for account service issues. Furthermore, the PIN may be required to complete a transaction at a merchant 110, or at an ATM. The user 100 can enter the PIN on a PIN reader, similar to debit card PIN readers currently installed at many merchant locations and businesses. Alternatively, the user 100 may be required to sign a receipt or electronic screen pad, and show identification, such as a driver's license, to complete a transaction at a merchant 110. This embodiment is similar to traditional credit card verification currently utilized by merchants.

Further, upon verification that the necessary funds are available in the credit account 112, the financial institution 104 instantly debits the purchase amount from the credit account 112. The financial institution 104 then transmits a sell request to the clearinghouse 106. The sell request includes any account information related to the user 100, the dollar amount of commodity to sell on behalf of the user 100 so that the bank can receive credit for the purchase amount, and a specification of a particular commodity to sell (if the credit account 112 has multiple underlying commodities).

After receiving the sell request from the financial institution 104, the clearinghouse 106 sells the requested amount of the commodity or commodities to buyers in the appropriate commodity markets. After the sale is completed, the clearinghouse 106 transmits the proceeds of the sale to the financial institution 106, minus any transaction or service fees, or commissions. Thus, upon making a purchase, the user's credit account 112 is debited by the purchase value, and the underlying commodity is sold in the amount of the purchase price so that the financial institution 104 can be credited appropriately for the user's purchase.

In another embodiment, the financial institution 104 may choose to hold all debits to a credit account 112 until a specified time, i.e., end of business day, end of week, etc., and then have the clearinghouse 106 process a batch of sell orders at once. This allows the financial institution 104 to speculate on the price of the underlying commodity. By waiting until the price of the underlying commodity increases, the financial institution 104 may achieve higher returns from the transaction to settle the user's credit account 112. Conversely, this strategy may expose the financial institution 104 to downside risk in the event the underlying commodity's value decreases.

In an embodiment, the user 100 can only spend up to the value of the credit account 112. Thus, if the user 100 makes purchases driving the value of the credit account to $0.00 USD, the user 100 will no longer be able to make purchases against the credit account 112 until additional funds are deposited into the deposit account 102.

As commodity prices can fluctuate drastically, the credit account 112 may lose a significant amount of value if the underlying security's value drops significantly. Thus, the purchasing power of the user 100 can also be limited during any downturns in the underlying commodity's market price.

The financial institution 104 can alert the user regarding any fluctuations in the underlying commodity and value of their credit account 112. The user 100 can set alert limits, for example, requesting an alert when the underlying commodity price fluctuates more than 5% in a given time period, such as a week. In another example, the user 100 can set alert limits requesting an alert when the underlying commodity price decreases or increases by a certain amount or percentage. The user 100 can also request that alerts are sent on a more frequent basis, such as every hour, or when the commodity price fluctuates 1% in a given direction at any time. In another embodiment, alerts can be sent to the user 100 when there is breaking news or extended coverage of a commodity which may affects the market value of the commodity price.

The user 100 may receive these alerts via various means, such as e-mail messages, text and multimedia messages, automated phone calls, facsimile, updates on the financial institution's website or Internet portal, at an ATM, or via traditional postal mail. In an embodiment, these alerts may include advertisements or sponsored third-party links which can generate additional revenue for the financial institution 104.

Figure 2:
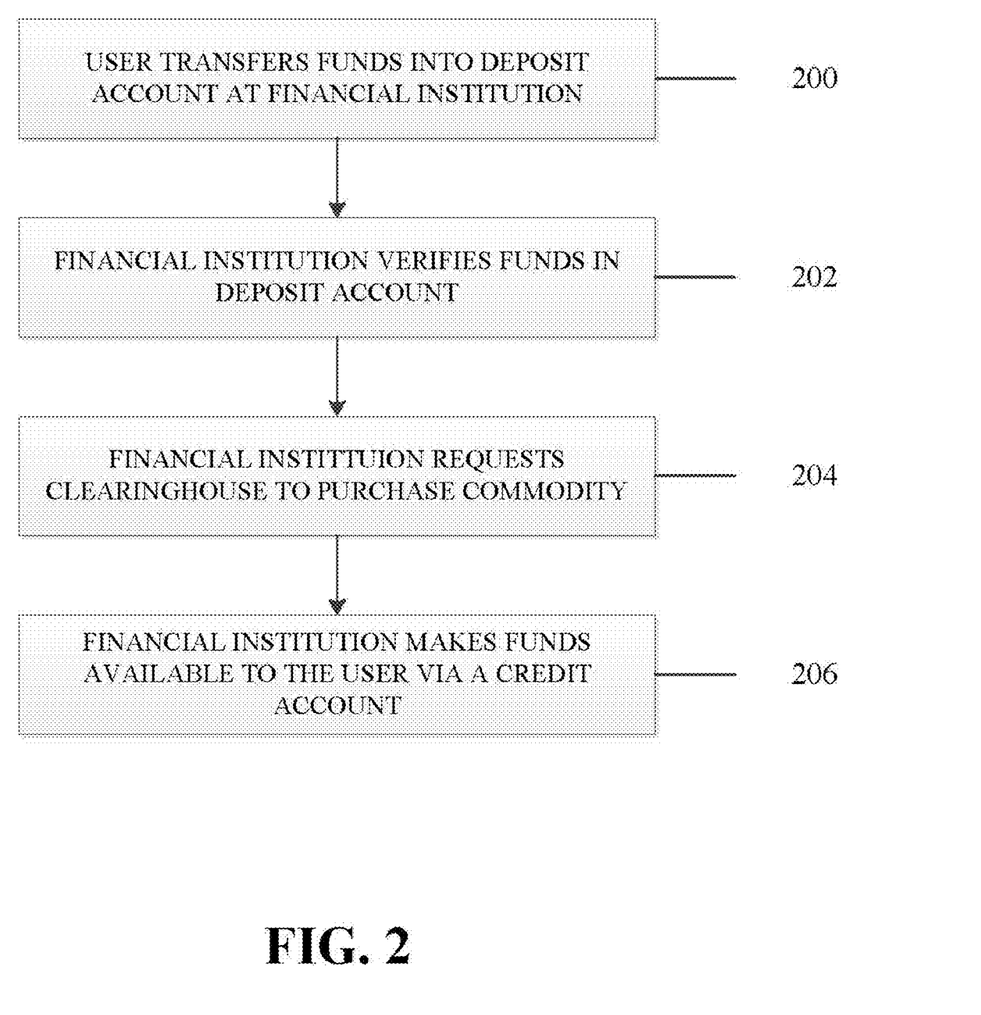
FIG. 2 is a flowchart illustrating the steps of funding a pre-paid commodity-based credit account according to an embodiment of the invention.

FIG. 2 is a flowchart illustrating the steps of funding a pre-paid commodity-based credit account according to an embodiment of the invention. In step 200, the user 100 transfers monetary funds into a deposit account 102 at a financial institution 104. The user 100 may transfer funds in-person by depositing cash, checks, money orders, or other legal tender or items of value at the financial institution 104. The in-person location may be a branch, service center, or ATM. The user 100 may also transfer funds electronically from another account into their deposit account 110. Such electronic means can include wire transfer or automated clearing house (ACH) transfers. In an embodiment, the user 100 may have payroll, retirement account, or brokerage account funds directly deposited into the deposit account 102 on an on-going basis.

Next, in step 202, after the deposit account 102 has been funded, the financial institution 104 verifies that all deposited funds have cleared and settled. In an embodiment, if the user 100 deposits a check which requires, for example, three business days to settle, the financial institution 104 can issue a temporary credit to the user 100. This allows the user 100 to be able to instantly have commodities purchased on its behalf without having to wait for the deposit account 102 funds to settle, and potentially be subject to negative market fluctuations. The temporary credit is pending a settlement of the deposit account 112 funds, and the financial institution 104 may reverse the credit and debit the user's credit account 112 accordingly in the event that these funds do not clear.

After the financial institution 104 has verified the funds in the deposit account 102, the financial institution 104 transmits a purchase request to a clearinghouse 106. The purchase request includes any account information related to the user 100, the dollar amount of commodity to purchase on behalf of the user 100, and specification of a particular commodity to purchase (if the user 100 wishes to purchase multiple commodities). In an embodiment, the financial institution 104 may transmit the monetary deposit, or funds equal to the monetary deposit amount, to the clearinghouse 106. These funds may be used by the clearinghouse 106 to fulfill the purchase request from the financial institution 104.

The purchase request can be sent electronically through a network configured to route such requests from multiple financial institutions to the clearinghouse 106. The purchase request can also be transmitted via e-mail, facsimile, or telephone. However, in a preferred embodiment, a high-speed, encrypted, secure communications means is utilized between the financial institution 104 and the clearinghouse 106 so that the transaction can be completed in real-time or near real-time. After receiving the purchase request, the clearinghouse 106 purchases the underlying security per the purchase request instructions.

Next, in step 206, after the clearinghouse 106 purchases the underlying security per the purchase request, the financial institution makes funds available to the user 100 by establishing a credit account 112. At its onset, the credit account 112 balance reflects the value of the underlying commodity based on the funds deposited in the deposit account 102, minus any transaction or service fees, or commissions. These transaction or service fees, or commissions, can be charged by the financial institution 104, the clearinghouse 106, or any third-party entities involved with the purchase and settlement transaction. Furthermore, the balance available to the user 100 is constantly updated and changing as the price of the underlying security or securities fluctuates.

After the credit account 112 is established, the financial institution 104 can issue a purchase card to the user 100 that enables the user 100 to make purchases against the credit account 112. In an embodiment, the purchase card is compatible with existing credit card processing terminals and merchant processing terminals, and the purchase card is accepted worldwide wherever traditional credit and debit cards, such as Visa, MasterCard, Discover, and American Express, are accepted.

Figure 3:
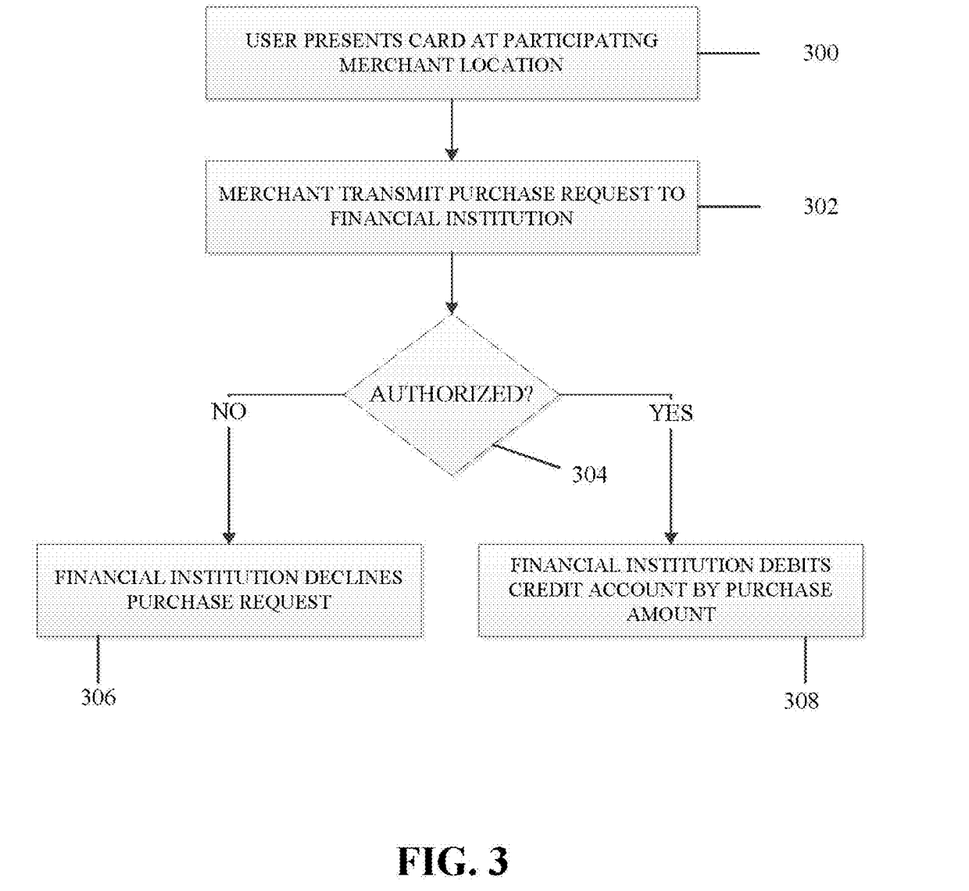
FIG. 3 is a flowchart illustrating the steps of making purchases from a pre-paid commodity-based credit account according to an embodiment of the invention.

FIG. 3 is a flowchart illustrating the steps of making purchases from a pre-paid commodity-based credit account according to an embodiment of the invention. In step 300, the user 100 presents a purchase device, such as a purchase card, associated with the pre-paid commodity-based credit system to a merchant 110. The purchase device can be issued by a financial institution 104 or a third-party card issuer or service provider.

In an embodiment, the purchase device can be a key fob or a mobile device configured to act as an information transmitter. In this embodiment, the key fob or mobile device can be communicatively coupled to the card reader via a short-range communication protocol, such as Bluetooth or RFID.

Next, in step 302, the merchant 110 scans, swipes, or otherwise captures data from the purchase card through a reader, such as a card reader, and transmits a purchase request to the financial institution 104. The purchase request can include information such as the user's account number, the requested purchase amount, and/or a merchant identifier. The purchase request can be transmitted from the merchant 110 to the financial institution 104 via an electronic merchant payment gateway. The term "merchant" is not limited to brick-and-mortar stores, but also online merchants, e-commerce web sites, and auction websites.

Next, in step 304, the financial institution 104 reviews the purchase request from the merchant 110, and compares the requested purchase amount against the available credit in the user's credit account 112. If there is sufficient credit available in the credit account 112 to cover the purchase amount, then, in step 308, the financial institution 104 authorizes the purchase and debits the funds in the credit account 112 by the purchase amount. If, on the other hand, there is not sufficient credit available in the credit account 112 to cover the purchase amount, then, in step 306, the financial institution 104 declines or denies the purchase request, and the user 100 is prevented from completing the purchase.

In determining whether there is sufficient value in the credit account 112, the financial institution 104 determines the current market value of the underlying commodity, and uses this value to calculate the available credit of the credit account 112. The user 100 has a purchase limit equal to the available credit of the credit account 112.

If the financial institution 104 approves the purchase request from the merchant 110, then the financial institution 104 issues a sell request to the clearinghouse 106 in the amount of the purchase amount.

In another embodiment, there is a third-party payment processing entity between the merchant 110 and the financial institution 104. The payment processing entity can interface the financial institution 104 databases and authorize or decline the purchase request on behalf of the financial institution. In yet another embodiment, a third-party pre-paid commodity-based credit account service provider (not shown) can be located between the merchant 110 and the financial institution 104.

Figure 4:
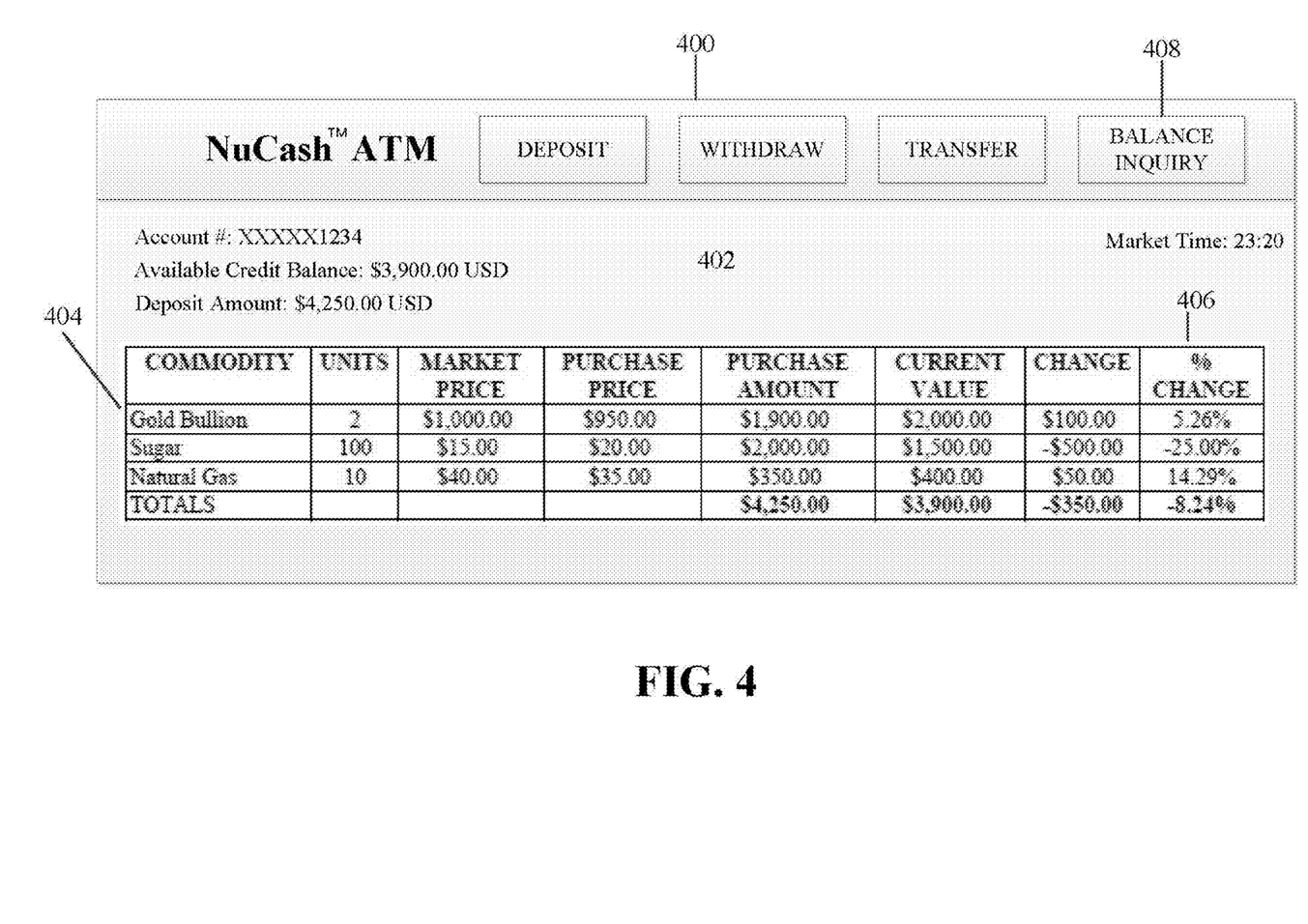
FIG. 4 is an illustration of an automated teller machine display according to an embodiment of the invention.

FIG. 4 is an illustration of an automated teller machine display according to an embodiment of the invention. The user 100 can make deposits, withdrawals, transfers, and check their account balance through an ATM 400. The ATM 400 can be associated with the financial institution 104, or a third-party service provider that manages the pre-paid commodity-based credit account system. The ATM 400 includes a display 402 which can display various account information, such as a user name, account number, and market time. The display 402 also shows the available credit balance. In display section 404, the number of units owned of each commodity, the current market price of each commodity, the value of each holding, and the percentage and/or dollar value change in the holdings is shown. If the user 100 has multiple commodities underlying their credit account 112, then each commodity and value breakdown is displayed as well in display section 404. The user is displayed the percentage change in their available credit balance in column 406. In a preferred embodiment, the available credit balance is adjusted in real-time on the display 402 as the market price of underlying commodity fluctuates.

In an embodiment, the ATM 400 also has menu buttons 408 which allows the user 100 to withdraw funds in the form of cash, deposit funds to their deposit account 102, and transfer funds between accounts. A "Balance Inquiry" button allows the user to print their account statement, or have the statement electronically sent to the user 100 via email or text message.

Figure 5:
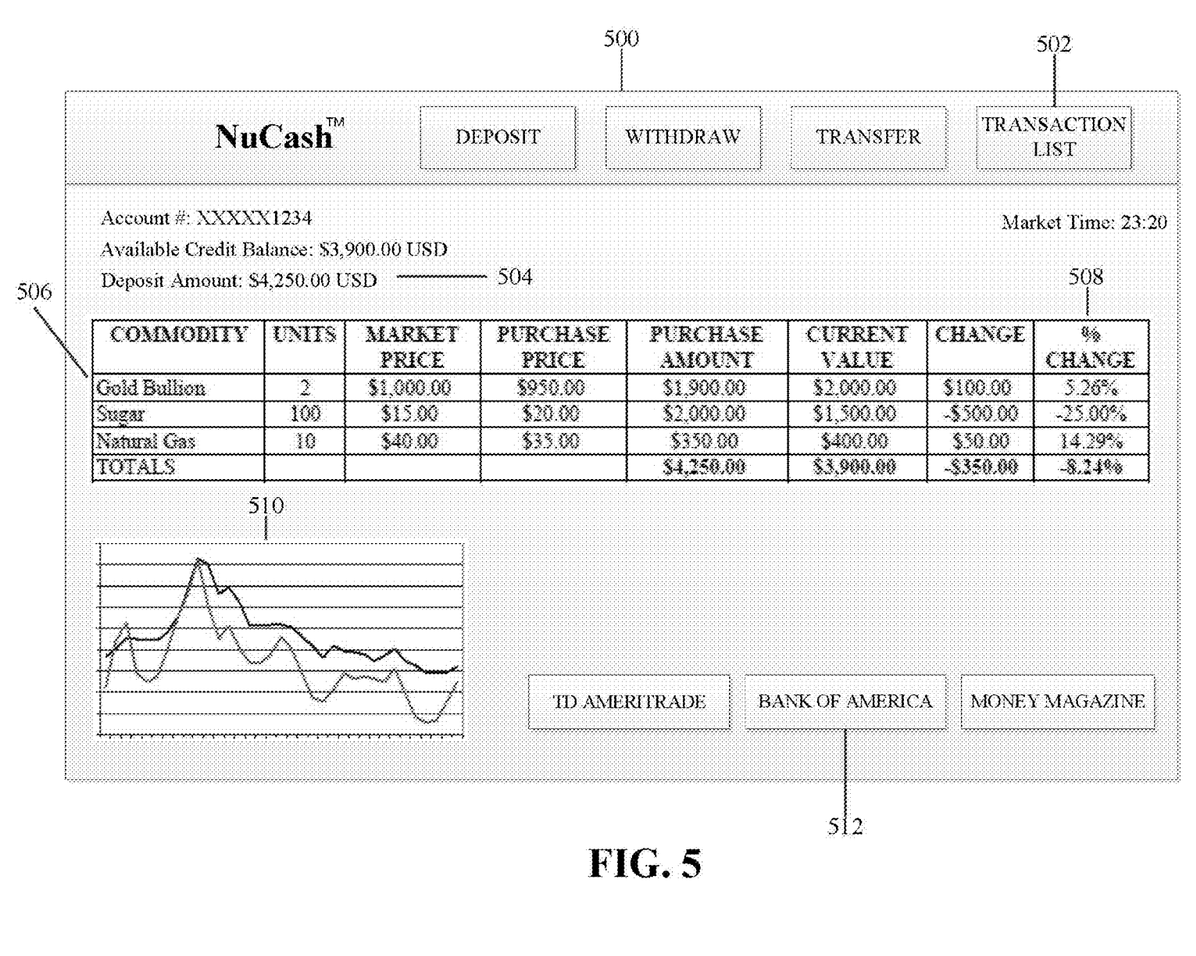
FIG. 5 is an illustration of an Internet portal according to an embodiment of the invention.

FIG. 5 is an illustration of an Internet portal according to an embodiment of the invention. The portal 500 can be accessed by the user 100 using any type of computing devices, such as a computer, portable digital assistant (PDA), netbook, mobile phone, iPod, iPad, Blackberry, or any other portable device that is Internet-enabled. The portal 500 can be security encrypted and require a user password or PIN for access. The portal 500 can be managed by the financial institution 104, or by a third-party service provider that manages the pre-paid commodity-based credit account system.

After logging into the portal 500, the user 100 will see the current market time, their available credit balance 504, and various other information relating to the account. The account details section 506 lists all of the commodities owned by the user 100. The account details section 506 displays the number of units owned of each commodity, the current market price of each commodity, the value of each holding, and the percentage and/or dollar value change in the holdings. For example, in FIG. 5, the user 100 owns two units of gold bullion having a current market price $1,000 USD per unit. Thus, the total value of the user's gold bullion holdings is $2000.00 USD.

The portal 500 also displays the change in value of the commodities for the user 100. Column 508 shows that since the user 100 bought gold bullion, the user's gold bullion value have increased by approximately 5% due to an increase in the market price of gold bullion. Conversely, the user's sugar value has decreased by 25% due to a decrease in the market price of sugar. In an embodiment, the user 100 can click on any commodity holding and a detailed screen will appear with additional charting, trends, news, and information related to the particular commodity.

In an embodiment, the portal 500 also has menu buttons 502 which allows the user 100 to electronically withdraw funds to another account, electronically deposit funds to their deposit account 102 from another account, and electronically transfer funds between accounts. A "Transaction List" button allows the user to view account statements, pending transactions, and other information related to merchant purchases and account debits and credits.

The available credit balance and other figures can be displayed in United States Dollars, or any currency preferred by the user 100. For example, if the user 100 resides in France, the balance and figures can be displayed in Euros, and all corresponding financial transactions that occur on the system (purchasing, selling, withdrawing, etc.) can occur based on the country of residence or current location of the user 100. Furthermore, if a user 100 initiates a transaction in France with a French merchant, the transaction amount will be computed in Euros, and the corresponding amount of commodity that will be sold to satisfy the transaction amount will be computed in Euros.

The portal 500 can include a chart 510 that displays overlapping trends of each commodity that the user 100 owns. The chart 510 can be toggled to display year-to-date, daily, monthly, weekly, etc. metrics. The chart 510 allows the user to visually compare the performance of each commodity simultaneously.

In an embodiment, various versions of the portal 500 can be developed for various platforms, such as mobile phones and PDAs. These versions may contain a different layout but will still convey substantially the same type of content and information as portal 500.

In another embodiment, the portal 500 can include advertisements or links 512 to third-party vendors and companies operating in the commodity trading space. These third-party advertisements and links can be paid-per-click links which produce additional revenue for the financial institution 104.

In yet another embodiment, the financial institution 104 can issue gift cards that are based on an underlying commodity. For example, the user 102 can purchase gold bullion, and have the value of the gold bullion placed on a gift card for another person to use. The creation and use of a gift card is similar to the process described above for a purchase card, however, the credit account is not in the name of the user 102. The gift credit account can be a generic account at the financial institution 104 that holds various gift commodities, with each commodity or group of commodities assigned to a specific gift card.

In another embodiment, the user 100 can use the credit account 112 as a savings account, where withdrawals and transfers in the account may be limited, and the financial institution 104 may provide an interest on balance of the credit account.

In yet another embodiment, actual commodities are not purchased on behalf of the user 100, but instead, exchange traded funds, mutual funds, or securities whose holdings are primarily commodities are purchased. In this embodiment, the clearinghouse 106 may be a brokerage house which facilitates the purchase of such investment vehicles. Examples of these investments include SPDR Gold Shares (GLD), Fidelity Select Natural Gas (FSNGX) and ProShares Ultra Oil & Gasoline (DIG). The principles described above may be applied to the purchase of commodity-based investments, instead of physical commodities.

In another embodiment, the user 102 can borrow against the available funds in their credit account. For example, if the value of the user's credit account rises above their initial deposit, the user 102 has essentially created equity in their investment. The financial institution 104 may allow the user 102 to borrow against this equity.

The user 102 may also borrow funds directly from their credit account, regardless of whether they have a positive or negative balance from their initial deposit. In this embodiment, instead of selling down or liquidating their commodity holdings, the user 102 can borrow directly against their commodity positions. The financial institution 104 may limit the amount that a user can borrow to their initial deposit, to the value of the credit account at any given time, or to a value exceeding the credit account value.

The embodiments of this invention, specifically depositing funds, making purchases, transferring funds, purchasing and selling commodities, and all other related transactions described herein may be conducted on a mobile platform, such as a portable phone, smartphone, iPhone, iPad, Blackberry, laptop computer, netbook, or any other portable device that is capable of accessing a network.

While the principles of this invention have been illustrated in relation to the exemplary embodiments shown herein, the principles of this invention are not limited thereto and include any modification, variation or permutation thereof.

What is claimed is:

1. A method of funding and using a commodity-based credit account, comprising the steps of:
receiving a deposit at a financial institution computing system;
transmitting a commodity purchase request from the financial institution computer system to an automated clearinghouse;
purchasing a first commodity and a second commodity using the deposit through the automated clearinghouse based on the commodity purchase request;

establishing a credit account at the financial institution computer system, the credit account having a value that fluctuates based on market prices of the first commodity and the second commodity;

selling at least one of the first commodity and the second commodity through the automated clearinghouse when the credit account is debited by a purchase transaction; and transmitting an alert from the financial institution computer system to a remote device when the market price of the first commodity or the second commodity changes by a pre-determined percentage in a given time period.

2. The method of claim 1, further comprising the step of transmitting the deposit to the automated clearinghouse, wherein the deposit is used to purchase the first commodity and the second commodity.

3. The method of claim 1, wherein the first commodity and the second commodity are selected from a group consisting of precious metals, energy, agricultural products, livestock, and consumer staples.

4. The method of claim 1, wherein the first commodity or the second commodity is gold bullion.

5. The method of claim 1, further comprising the step of issuing a purchase card to a user, the purchase card linked to the credit account.

6. The method of claim 5, wherein the value of the credit account is debited when the user performs a transaction using the purchase card.

7. The method of claim 1, further comprising the step of deducting a commission amount from the deposit by the automated clearinghouse or the financial institution after the purchase transaction occurs.

8. The method of claim 1, further comprising transmitting an alert from the financial institution computer system to the remote device when the market price of the first commodity or the second commodity changes at least 1% during a given time period.

9. A commodity-based credit system, comprising:

a credit account at a financial institution, the credit account having a monetary value based on market prices of multiple commodities, the credit account funded by a purchase of the multiple commodities via a commodity clearinghouse using funds deposited by an account holder;

a purchase device associated with the credit account; and a device reader located remotely from the financial institution, the device reader configured to transmit a transaction amount to the financial institution via a network; and an alerting module located at the financial institution, the alerting module configured to transmit an alert from the financial institution to the account holder when the market price of any of the multiple commodities changes by a pre-determined percentage in a given time period, wherein after receiving the transaction amount from the device reader, the financial institution is configured to sell an amount of at least one of the multiple commodities equal to the transaction amount.

10. The system of claim 9, wherein the network is an electronic merchant payment gateway.

11. The system of claim 9, wherein the purchase device is a card, and the device reader is a card reader.

12. The system of claim 9, wherein the purchase device is a mobile device.

13. The system of claim 12, wherein the mobile device is communicatively coupled to the device reader via a short-range communication protocol.

14. The system of claim 9, wherein the purchase device has a purchase limit equal to the value of the credit account.

15. A method for settling purchases in a commodity-based credit system, comprising:

receiving a deposit at a financial institution computer system;

funding a credit account by purchasing multiple commodities using the deposit through an automated clearinghouse, the credit account having an account value that fluctuates based on market prices of the multiple commodities;

transmitting a purchase amount from a remote terminal to the financial institution computer system;

comparing, at the financial institution computer system, the purchase amount to the account value;

debiting by the financial institution computer system, the credit account value by the purchase amount;

transmitting a commodity sale request from the financial institution computer system to the automated clearinghouse;

selecting to sell, by the automated clearinghouse or the financial institution, at least one of the multiple commodities linked to the credit account;

selling, by the automated clearinghouse, the selected commodity, based on the commodity sale request;

transmitting a proceed of the sale of the selected commodity from the automated clearinghouse to the financial institution computer system; and transmitting an alert from the financial institution computer system to a remote device when the market price of the any of the multiple commodities changes by a pre-determined percentage in a given time period.

16. The method of claim 15, wherein the remote terminal is a merchant terminal.

17. The method of claim 15, further comprising transmitting a denial to the remote terminal from the financial institution computer system if the purchase amount exceeds the account value.

18. The method of claim 15, further comprising the step deducting a commission from the proceed of the sale by the automated clearinghouse.

19. The method of claim 15, wherein the financial institution computer system transmits a batch commodity sale request to the automated clearinghouse after receiving multiple purchase amounts.

20. The method of claim 15, wherein the multiple commodities are selected from a group consisting of light crude oil, natural gas, unleaded gasoline, heating oil, ethanol, electricity, alternative energy, gold, silver, platinum, copper, tungsten, steel, corn, soybeans, wheat, lean hogs, pork bellies, cattle, cocoa, coffee, cotton, and sugar.

* * * * *